United States Patent [19]

Whiteman, Jr.

[11] Patent Number: 4,850,723
[45] Date of Patent: Jul. 25, 1989

[54] BEARING AND SEAL ASSEMBLY FOR MOTOR MIXER

[76] Inventor: Marvin E. Whiteman, Jr., 2254 Braniff St., Boise, Id. 83706

[21] Appl. No.: 306,088

[22] Filed: Feb. 3, 1989

[51] Int. Cl.$^4$ .................. F16C 21/00; F16C 33/72; B01F 7/02; B28C 5/18
[52] U.S. Cl. .................. 384/477; 366/62; 366/331; 384/126; 384/473
[58] Field of Search .................. 384/126–128, 384/445, 461, 462, 473, 474, 477, 484, 518, 627; 366/331, 62, 63, 45, 47

[56] References Cited

U.S. PATENT DOCUMENTS

| | | | |
|---|---|---|---|
| 3,921,962 | 11/1975 | Feger et al. | 366/331 X |
| 3,932,006 | 1/1976 | Tertinek et al. | 384/462 |
| 4,097,926 | 6/1978 | Face, Jr. | 366/47 X |
| 4,728,198 | 3/1988 | Maekawa et al. | 366/331 X |

Primary Examiner—Thomas R. Hannon
Attorney, Agent, or Firm—Frank J. Dykas; Craig M. Korfanta

[57] ABSTRACT

A bearing and seal assembly 10 for a mortar mixer having attached to mortar mixer frame 36 a stationary cylindrical housing 14 for rotatably receiving and supporting a hollow cylindrical drum support shaft 11 attached to mortar drum end wall 18. The stationary frame 14 and drum support shaft 11 defining cylindrical cavity 48 between them into which lubricating grease can be injected through grease fitting 25 in stationary housing 14. The drum support shaft 11 further having ball bearing assembly 49 contained therein for rotatably supporting paddle shaft 12 which is positioned coaxial with drum support shaft 11. The drum support shaft 11 further having a spring biased plurality of grease seals 30 sealing the cavity within drum support shaft 11 around paddle shaft 12 between ball bearing assembly 49 and grease seals 30. Hole 21 is provided in drum support shaft 11 for injection of grease from cylindrical cavity 48 between drum support shaft 11 and stationary housing 14 into the drum support shaft cavity.

17 Claims, 2 Drawing Sheets

BEARING AND SEAL ASSEMBLY FOR MOTOR MIXER

BACKGROUND OF THE INVENTION

1. Technical Field

This invention generally relates to a bearing and seal assembly for use with portable, powered, mortar mixers having a horizontally oriented mixing drum rotatable from a mixing position to a dumping position and a powered paddle shaft extending coaxially therethrough with radially extending paddles and power means for mixing mortar. More particularly it relates to a dual action bearing and seal assembly for supporting a rotatable paddle shaft and the rotatable drum which can be lubricated with grease through a grease fitting rigidly and permanently connected to a grease pump attached to the mortar mixer.

2. Background Art

Brick layers, and masons in general, need a means of mixing mortar at job sites where brick or stone work is to be accomplished. Traditionally mixing mortar has been a job assigned to the brick layer's assistant, sometimes called a hog carrier, and was done by hand. In recent years portable, power driven, mortar mixers have come into common usage.

It is useful to describe a typical mortar mixer in order to fully understand the import of the present invention. The typical portable mortar mixer is mounted to a utility trailer frame and is towed from job site to job site. It has a horizontally oriented cylindrical mixing drum which is open at the top and rotatable from an open top position into which mortar, sand and water are dumped for purposes of mixing, to a dumping position where mixed mortar is dumped onto a mortar board for use by the mason. A paddle shaft extends through and is axially aligned with the horizontal drum. Extending radially from the paddle shaft are a plurality of paddles which are used to mix the combination of materials into suitable mortar. Power is provided by a gasoline engine.

Since both the paddle shaft and the drum are independently rotatable, the bearing support system for the mortar mixer, as a general rule, has to include at least a pair of concentric rotatable shaft assemblies, one for the paddle wheel and the second for the drum. The environment in which these bearing assemblies are used, can at best, be described as hostile. They are used in all sorts of weather conditions and, are located in very close proximity to the abrasive mixtures of mortar, sand and dust. As a result maintaining proper lubrication for the paddle shaft and drum bearing assemblies is difficult.

TERTINEK, ET AL., U.S. Pat. No. 3,932,006 discloses a paddle shaft seal assembly which is typical of that in use today. As can be seen in Tertinek, the lubricant is grease, and it is injected into the paddle shaft bearing through one grease fitting, and into the drum bearing assembly by another grease fitting. The reason why two separate grease fittings are used is the fact that the independent rotation of the two concentric shafts, by definition results in one shaft housing rotating relative to the other.

The problem is that the bearing assembly such as that disclosed in Tertinek, must be greased periodically, and since there are two independent grease fittings, at least one of which must rotate relative to the other and/or the mortar mixer frame, lubrication can only be accomplished by use of a hand-held grease gun and independent grease fittings for each bearing assembly.

Another problem arises by reason of the close proximity interface between the motor drum containing a white or light colored mortar, and a heavily greased bearing assembly. The greased bearing assembly must be protected from infiltration of abrasive mortar and dust, and at the same time grease must be kept out of the mixing drum and away from the mixed mortar where it will cause discoloration. The traditional solution to both of these problems is to seal the junction between the paddle shaft and the bearing housing with grease packed rubber sealing rings interspaced between various configurations of metal spacers and held in place by an overpressure of packed grease. Again see Tertinek, et al. for a typical configuration.

This is not a satisfactory solution for two reasons. The first is that the packed grease slowly, but steadily, escapes from the bearing assembly, and oftentimes travels along the paddle shaft into the mixing drum where it contaminates mortar mix. This occurs most often with a bearing assembly that is properly packed with grease but has worn seals.

A second, and more common problem, is that oftentimes the bearing is not properly packed. The reason is that it requires a portable grease gun for use in injecting grease. The portable grease gun must be carried to remote locations with the machine, and it is often forgotten, mislaid, or pilfered, with the common result that the bearing assemblies go ungreased for long periods of time.

A solution would be to provide some sort of an automatic or hard plumbed grease gun system made integral with the mortar mixer unit whereby grease could be periodically injected into the bearings to keep them properly packed. A hard plumbed system such as this, being integral with the utility trailer, would always be available and not subject to being forgotten, mislaid, or pilfered. The problem is that at least one of the two bearing housings, either for the drum, or the paddle shaft, will rotate relative to the other. Until now this has made the installation of a hard plumbed greasing system, impossible.

Accordingly it is an object of this invention to provide a dual bearing and seal assembly for use with a mortar mixer, in which both the paddle shaft bearings, drum bearings and grease seals can all be greased through the use of one grease fitting that is stationary with respect to the mortar mixer frame.

A second object of the present invention is to provide a shaft sealing system that prevents the discharge of grease from the bearing assembly yet at the same time prevents the infiltration of abrasive mortar mix or dust.

DISCLOSURE OF INVENTION

These objects are accomplished by use of bearing and seal assemblies for a mortar mixer which provide stationary cylindrical housings attached to drum support struts, wherein said stationary cylindrical housings have drum bearing support means therein for rotatably receiving and supporting drum support shafts.

Attached to the ends of the drum, coincident with the horizontal axis of the mortar mixing drum, are hollow, cylindrical, drum support shafts which are inserted into the stationary cylindrical housings and are supported for rotation against the drum bearing support means.

A paddle shaft, axially inserted and coincident to the axis of the mixing drum, extends out through both ends of the mixing drum, and is inserted through a grease seal into ball bearing assemblies which are positioned inside the drum support shafts at the ends opposite those attached to the drum.

The ends of the drum support shafts attached to the drum each have, fabricated integral therewith, a seal ring retaining flange. A plurality of flexible seals, alternately interspersed between ring seals are provided, with an end seal ring, held in position against the ring seal retaining flange, and at the opposite end of the rings and seals assembly, a spring support ring seal. A coil spring is provided and held in compression inside the hollow, cylindrical drum support shaft against the ball bearing assembly at the outer end, and the spring support ring seal at the inner end. The cylindrical spring holds the ring seals in position against the seal ring retaining flange. This ring seal assembly provides a barrier which protects the bearing assembly from mortar and mortar dust, and prohibits the discharge of grease from the drum support shaft.

The drum support shafts, which are attached to each end of the mixing drum, are supported by a single journal bearing fabricated integral with the stationary cylindrical housing. Each stationary cylindrical housing, together with the inserted cylindrical drum support shaft, define a cylindrical cavity between the two. A grease injection hole is provided through the stationary cylindrical housing for the introduction of grease into this cylindrical cavity which serves as the journal bearing between the stationary cylindrical housing and the drum support shaft. A second grease injection hole is provided through the hollow, cylin-drical, drum support shaft, through which grease from the cylindrical cavity can be further injected into the central core of the drum support shaft. Two ring seals are provided to seal the ends of the cylindrical cavity to prevent the discharge of grease from the cylindrical cavity to the outside of the stationary housing assembly.

Since the method of injecting grease into both the cylindrical cavity and the interior core of the drum support shaft, is through an injection port hole in the stationary housing, the same can and is hard plumbed through grease line tubing to a grease gun assembly which itself is hard plumbed and attached to the frame of the mortar mixer. A manifold including a manual selector valve is provided to direct the flow of grease to one or the other of the two bearing and seal assemblies.

BEST MODE FOR CARRYING OUT INVENTION

Figure 1:
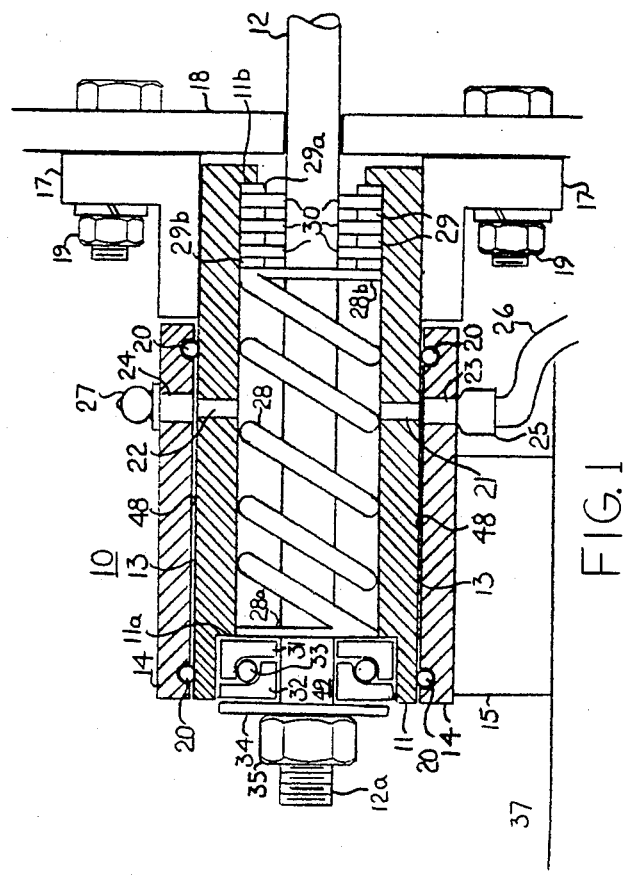
FIG. 1 is a sectional side view of my new bearing and seal assembly.
Figure 2:
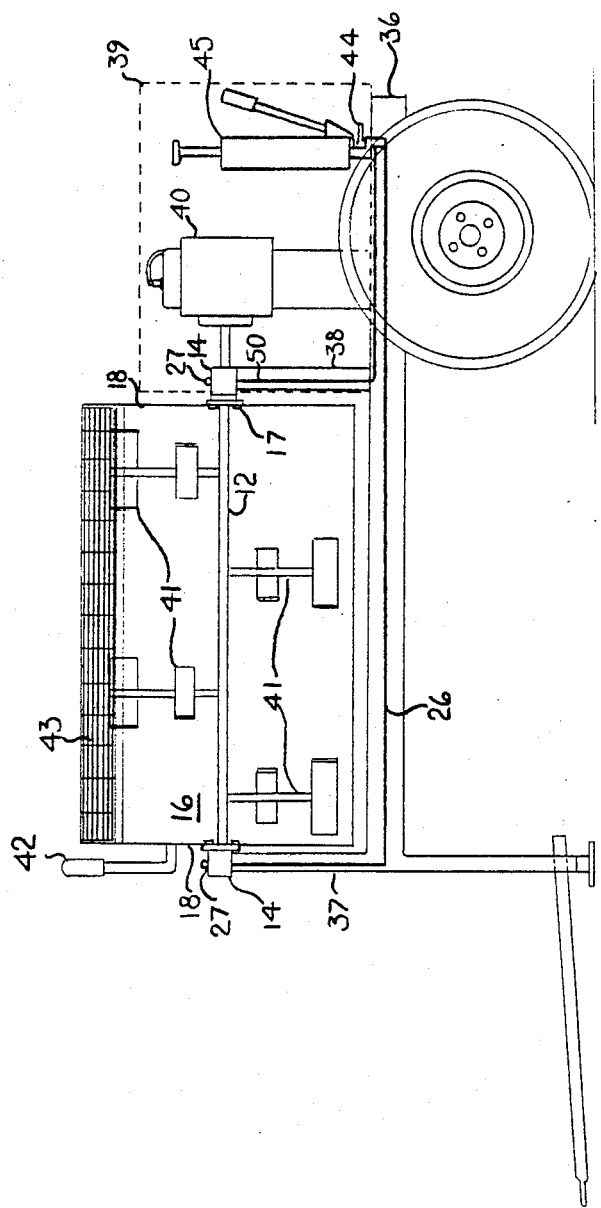
FIG. 2 is a representational side view of a portable mortar mixer showing my new bearing and seal assemblies and hard plumbed greasing system.

A sectional side view of bearing and seal assembly 10 is shown in FIG. 1. Stationary housing 14 is attached to housing strut 15 which is itself attached, as shown in FIG. 2, to front frame strut 37. Drum support shaft 11 is attached to mortar mixing drum end wall 18 by means of attachment flange 17 and attachment bolt assemblies 19. In the preferred embodiment drum support shaft 11 is welded to attachment flange 17 or welded directly to mixing drum end wall 18, however it should be apparent that support flange 17 could be cast integral with drum support shaft 11 or attached to it by means of a friction fit as opposed to welding.

Bearing and seal assembly 10 must function for two separate rotational movements, the first, to support paddle shaft 12, which as shown in FIG. 2, is engine driven by engine 40, and is used to rotate mortar mixing paddle assemblies 41 located inside of mortar mixing drum 16. The second rotational motion for which bearing and seal assembly 10 must function is that of rotating the mortar mixing drum 16 from an upright position from where mortar and water can be dumped through grate 43 into mortar mixing drum 16 for mixing, to a dump position where the mixed mortar can be dumped out into a mortar board or wheelbarrow, not shown, for transport to the immediate job site. The operator lowers mortar mixing drum 16 from its upright position to its dumping position by use of handle 42. The mixed mortar contents then spill out through protective grate 43.

Obviously the first rotational use, namely support of a rotating paddle shaft 12, sees considerably more use than the occasional dumping of the contents of mortar mixing drum 16.

As shown in FIG. 2, a pair of opposing bearing and seal assemblies 10 are used to support drum 16 and paddle shaft 12. Drum support shafts 11 function as axle shafts for drum 16, and are supported upon journal bearing surfaces 13 of stationary housings 14. Lubrication for the journal bearings surfaces 13 is provided by injecting lubricating grease through grease line 26 and grease line fitting 25 into lower stationary housing hole 23. Drum support shaft 11 is machined to an outside diameter dimension smaller than the interior diameter of stationary housing 14 with the inside surface of housing 14 being the journal bearing surfaces 13. Thus when drum support shaft 11 is inserted into stationary housing 14, there is formed between them a cylindrical cavity 48 into which lubricating grease can be injected. Lubricating grease is contained within the defined cylindrical cavity 48 by means of housing seal ring 20, and is allowed to migrate into and between the journal bearing surfaces 13 of stationary housing 14 and drum support shaft 11.

The second rotational function of bearing and seal assembly 10 is support and rotation of paddle shaft 12. A ball bearing assembly 49 has inner race 31, outer race 32 and ball bearings 33, and is used to rotationally support paddle shaft 12. The bearing assembly 49 is inserted into drum support shaft 11 from its outer end as opposed to its drum wall end and is held in place between paddle shaft bearing race retaining lip 11a and bearing washer 34. Compressive adjustment of bearing assembly 49 is accomplished by use of bearing nut 35 on threaded section 12a of paddle shaft 12.

Paddle shaft roller bearing assembly 49, even if it is a sealed bearing assembly as it is in the preferred embodiment, must be protected from mortar and mortar dust infiltrating out from drum 16 through the paddle shaft opening in end walls 18. Yet at the same time, the lubricating grease which is used in conjunction with seals 30 to protect the bearing surfaces, must be kept from migrating into mortar mixing drum 16 where it will contaminate and discolor mortar being mixed. To accomplish this, a plurality of neoprene shaft seals 30 are provided interspersed and thereby held and spaced apart between shaft seal rings. End shaft seal ring 29a is positioned against seal retaining flange 11b of drum support shaft 11. Next comes an alternating sequence of shaft seals 30 and seal rings 29, and a final spring support shaft seal ring 29b. This seal assembly is held in position against seal retaining flange 11b by means of spring 28.

Spring 28 is held in compression to hold the seal assembly in place with spring bearing end 28a held against inner race 31 of bearing assembly 49, and spring seal ring end 28b against spring support shaft seal ring 29b. This in and of itself is a significant improvement over the prior art in that it eliminates the need for a pressurized grease supply to hold shaft seals 30 in position. This reduces the leakage of lubricating grease out through the seal assembly along shaft 12.

Lubricating grease is injected into the cavity formed in drum support shaft 11 between shaft seals 30 and bearing assembly 49 via lower drum support shaft hole 21. In effect, lubricating grease provided through grease line 26 enters the cylindrical cavity 48 between drum support shaft 11 and stationary housing 14, and then passes through lower drum support shaft hole 21 into the inner cavity formed within drum support shaft 11 to provide grease to protect both the bearing assembly 49 and the shaft seals 30. In practice it has been found advantageous to form lower stationary housing hole 23 and lower drum support shaft hole 21 such that they are aligned when drum 16 is in an upright, or mixing position.

In this manner, grease line 26, which is hard plumbed and stationary relative to stationary housing 14, can be used to lubricate both bearing and seal assemblies.

An auxiliary method for injecting lubricating grease is provided for my bearing and seal assembly by means of standard grease fitting 27 which is used to inject grease from a hand held, portable grease gun, not shown, through upper stationary housing hole 24 and upper drum support shaft hole 22.

As shown in FIG. 2, grease gun 45 is hard plumbed to selector valve 44, and is used to inject lubricating grease through selector valve 44 into either forward bearing grease line 26 or rear bearing grease line 50. Both grease lines 26 and 50 are positioned against and protected by mortar mixer frame 36 and front and rear struts 37 and 38 to prevent inadvertent damage. Grease gun 45 is of a standard cartridge loading type, and is contained within engine cowling 39, and is thereby protected from damage. In practice it has been found that each bearing and seal assembly will wear at significantly different rates, and as a result, selector valve 44 is provided to insure that proper amounts of lubricating grease are injected into each separate assembly. If both grease lines 26 and 50 were to be directly coupled to grease gun 45, then an inordinately greater amount of lubricating grease would be injected into the bearing assembly having the loosest fitting grease seals 30.

Thus, when the mortar mixer trailer is returned to the shop, maintenance personnel can insure that a full canister of lubricating grease is inserted into grease pump 45. Then when the mortar mixer is towed, to a remote location, the owner or those responsible for maintenance of the mortar mixer, can be assured that an adequate supply of lubricating grease is available at the machine.

While there is shown and described the present preferred embodiment of the invention, it is to be distinctly understood that this invention is not limited thereto but may be variously embodied to practice within the scope of the following claims.

I claim:

1. A bearing and seal assembly for a mortar mixer which has a drum rotatable from a mixing position to a dumping position and a rotatable paddle shaft and paddle assembly therein which comprises:

a stationary cylindrical housing having drum bearing support means therein for rotatably receiving and supporting a drum support shaft;

a hollow, cylindrical drum support shaft attached at a first end to and extending out from the rotatable drum, and inserted at its second end into said stationary housing for support by and rotation against said drum bearing support means, said drum support shaft further having paddle shaft bearing support means disposed within said drum support shaft for receiving and supporting a rotatable paddle shaft;

paddle shaft seal means for preventing the discharge of grease from the paddle shaft bearing support means to the outside of the bearing and seal assembly;

said stationary housing having a hole therethrough for injection of grease between the stationary housing and the drum support shaft for lubricating the drum bearing support means and for facilitating the injection of lubricating grease into the hollow, cylindrical drum support shaft; and said drum support shaft having a hole therethrough for injection of lubricating grease into said drum support shaft for lubricating the paddle shaft bearing support means and paddle shaft seal means.

2. The seal assembly of claim 1 wherein said hollow, cylindrical drum support shaft further comprises:

a seal retaining flange at the first end attached to the rotatable drum; and a paddle shaft bearing retaining lip for positioning and holding a paddle shaft bearing assembly inserted into the hollow, cylindrical drum support shaft from the other, second end of said drum support shaft.

3. The seal assembly of claim 2 wherein said paddle shaft bearing support means further comprises a ball bearing assembly inserted into the second end of the drum support shaft and held against the paddle shaft bearing retaining lip.

4. The seal assembly of claim 3 wherein said paddle shaft seal means further comprises:

an end shaft seal ring disposed within the hollow, cylindrical drum support shaft and against the seal retaining flange;

a spring support shaft seal ring disposed within the hollow cylindrical drum support shaft and in parallel spaced relationship with the end shaft seal ring;

a plurality of inner shaft seal rings disposed in parallel spaced relationship between the end shaft seal ring and the spring support shaft seal ring;

a plurality of shaft seals each interspersed between the shaft seal rings; and a coil spring disposed and held in compression between the ball bearing assembly and the spring support shaft seal ring, for holding the shaft seal rings and shaft seals in compression against the seal retaining flange.

5. The seal assembly of claim 1 wherein the stationary cylindrical housing and the drum support shaft inserted therein further define a cylindrical cavity for the transport of grease from a hole in the stationary housing to the drum bearing support means.

6. The seal assembly of claim 5 which further comprises a pair of housing seal rings disposed at opposite ends of said cylindrical cavity for preventing the discharge of grease from said cylindrical cavity to the outside of the bearing and seal assembly.

7. The seal assembly of claim 1 which further comprises:
   means for pumping grease, under pressure; and
   conduit means operatively connecting the pump means to the stationary housing hole for injecting grease between the stationary housing and the drum support shaft.

8. The seal assembly of claim 7 which further comprises:
   the stationary housing further having an auxiliary hole for the injection of grease therethrough;
   the drum support shaft further having an auxiliary hole for the injection of grease therethrough; and
   a grease fitting attached to the auxiliary stationary housing hole.

9. An improved mortar mixer having a generally cylindrical mortar mixing drum disposed in a horizontal orientation, and open at the top, and rotatable from a mortar mixing position to a mortar dumping position, and a paddle shaft horizontally aligned and extending through the drum, coincident to the horizontal axis of the drum, said paddle shaft having a plurality of radially extending paddle for mixing mortar, and a power means for rotating said paddle shaft, and a main frame assembly for supporting the power means and a pair of struts attached to the main frame, said struts extending vertically upward from the main frame at each end of the horizontal drum for rotational support of said drum and paddle shaft, wherein the improvement comprises:
   a pair of stationary cylindrical housings each having drum bearing support means therein for rotatably receiving and supporting a drum support shaft, each attached to a vertical strut;
   a pair of hollow, cylindrical drum support shafts, each coaxially aligned and attached at a first end to an end of the rotatable drum, and inserted into a stationary housing for support by and rotation against said drum bearing support means, said drum support shafts further having paddle shaft bearing support means disposed within said drum support shafts for receiving and supporting the rotatable paddle shaft;
   paddle shaft seal means for preventing the discharge of grease from the paddle shaft bearing support means to the outside of the seal assemblies;
   said stationary housings each having a hole therethrough for injection of grease between the stationary housings and the drum support shafts for lubricating the drum bearing support means and for facilitating the injection of grease into the hollow, cylindrical drum support shafts; and
   said drum support shafts each further having a hole therethrough for injection of grease into said drum support shafts for lubricating the paddle shaft bearing support means and paddle shaft seal means.

10. The improved mortar mixer of claim 9 which further comprises:
    means for pumping grease under pressure; and
    conduit means operatively connecting the pump means to the stationary housing holes for injecting grease into the stationary housings.

11. The improved mortar mixer of claim 10 wherein said pumping means is a hand operated grease gun attached to said conduit means.

12. The improved mortar mixer of claim No. 11 which further comprises a selector valve attached to said conduit means for selectively passing grease from the grease gun to either of the stationary housings.

13. The seal assembly of claim 10 wherein each of said hollow, cylindrical drum support shafts further comprises:
    a sealing retaining flange at the first end attached to the rotatable drum; and
    a paddle shaft bearing retaining lip for positioning and holding a paddle shaft bearing assembly inserted into the hollow, cylindrical drum support shaft from the other, second ends of said drum support shafts.

14. The seal assemblies of claim 13 wherein each of said paddle shaft bearing support means further comprises a ball bearing assembly inserted into the second end of the drum support shaft and held against the paddle shaft bearing retaining lip.

15. The seal assembly of claim 14 wherein each of said paddle shaft seal means further comprises:
    an end shaft seal ring disposed within the hollow, cylindrical drum support shaft and against the seal retaining flange;
    a spring support shaft seal ring disposed within the hollow cylindrical drum support shaft and in parallel spaced relationship with the end shaft seal ring;
    a plurality of inner shaft seal rings disposed in parallel spaced relationship between the end shaft seal ring and the spring support shaft seal ring;
    a plurality of shaft seals each interspersed between the shaft seal rings; and
    a coil spring disposed and held in compression between the ball bearing assembly and the spring support shaft seal ring, for holding the shaft seal rings and shaft seals in compression against the seal retaining flange.

16. The improved mortar mixer of claim 15 wherein said pumping means is a hand operated grease gun attached to said conduit means.

17. The improved mortar mixer of claim no. 16 which further comprises a selector valve attached to said conduit means for selectively passing grease from the grease gun to either of the stationary housings.

* * * * *